United States Patent Office 3,174,945
Patented Mar. 23, 1965

3,174,945
PROCESS FOR DISPERSING SILICA FLATTING AGENT IN LINEAR SUPERPOLYESTERS DURING POLYMERIZATION
Charles W. Taylor, Jr., Akron, Richard C. Waller, Cuyahoga Falls, and Clyde E. Gleim, Akron, Ohio, assignors to The Goodyear Tire & Rubber Company, Akron, Ohio, a corporation of Ohio
No Drawing. Filed June 5, 1958, Ser. No. 739,987
11 Claims. (Cl. 260—40)

This invention relates to a method for making sheets and films of linear superpolyesters having a flat or matte appearance. More particularly, the invention relates to a method of incorporating a porous silica flatting agent into linear superpolyesters.

It is an object of this invention to produce a flatted film of linear superpolyesters. It is another object to provide a method for making such flatted films. It is another object to provide a method of increasing the stability of linear superpolyester films to the effect of ultra violet light. Other objects will appear hereinafter as the description of the invention proceeds.

The polyesters with which the present invention is concerned are linear superpolyesters. They are conveniently made by ester interchange and condensation reactions in which an ester of a dibasic acid is reacted with a glycol to form bis glycol esters or low molecular weight polymers thereof which, by condensation reactions, with elimination of glycol, polymerize to form high molecular weight linear superpolymers. The bis glycol esters can be prepared by methods other than the ester interchange method and then polymerized by condensation reaction to form high molecular weight superpolymers. In practice, using the ester interchange method for example, the polyesters are prepared in three steps as follows:

ESTER INTERCHANGE

Step 1—

Dimethyl esters plus glycol
→ bis glycol esters plus methyl alcohol

Step 2—

Bis glycol esters
→ low molecular weight polymers plus glycol

Step 3—

Low molecular weight polymer
→ high molecular weight polymer plus glycol

The high molecular weight polymer formed at the end of Step 3 is an extremely viscous, high-melting material. Uniform distribution of a solid, finely-divided substance throughout such a viscous mass is very difficult to obtain. When such a material is incorporated into the polyesters after the polymerization reaction is completed, products made therefrom are frequently streaked and have areas in which uneven distribution of the finely-divided material is apparent. Also, products made therefrom often contain large agglomerates of the finely-divided substance.

It might be thought that a finely-divided inert material, silica for example, could be added at an early stage in the reaction, such as in the first step wherein the glycol is reacted with the methyl esters to form the bis glycol esters, because at this stage the materials are all still monomeric and the reaction mixture has a very low viscosity. Unexpectedly, it was found that, although good dispersion of the inert material in the final product was obtained when the inert material was added at an early stage, the polyester thus formed had poor thermal stability and the drop in intrinsic viscosity of the resin when extruded into film was excessive. (The drop in intrinsic viscosity indicates degradation of the polymer.) Film produced from such polyester resin was somewhat brittle and had lower elongation than film of a similar polyester which had not undergone degradation. It has been discovered that the presence of an excessive amount of the glycol when the silica pigment is present is deleterious, and to obtain a stable silica containing polyester composition in which the silica is evenly dispersed, the silica must be added to the reactants when the glycol in excess of the stoichiometric amount required to react with the dimethyl phthalate esters to form the bis glycol phthalate esters has been removed and the condensation polymerization reaction has proceeded to a point where at least 75 percent and preferably at least 94 to 97 percent of the glycol eliminated in the condensation reaction has been removed.

Thus the invention provides a method of making a stable condensation polyester composition which comprises adding finely divided porous silica to polyester reactants at a point in the condensation reaction where at least 75 percent of the glycol eliminated in the condensation polymerization reaction has been removed and preferably from at least 94 to at least 97 percent of the glycol eliminated in the condensation polymerization reaction has been removed and then continuing the condensation reaction until the polyester formed has an intrinsic viscosity of at least 0.5.

The term intrinsic viscosity, represented by the symbol $[\eta]$, is used herein as a measure of the degree of polymerization of the copolyester. It is defined by the Billmeyer equation as follows:

$$[\eta] = \tfrac{1}{4}\left(\frac{\eta_{sp}}{C}\right) + \tfrac{3}{4}\left(\frac{\ln \eta_r}{C}\right)$$

wherein $\eta_r$ is the viscosity of the dilute 60/40 phenol/tetrachloroethane mixed solvent solution of the copolyester divided by the viscosity of the 60/40 phenol/tetrachloroethane mixed solvent itself measured under the same conditions as the copolyester solution; $\eta_{sp} = \eta_{r-1}$, where $\eta_r$ is as defined above; and $C$ is the concentration of the copolyester in grams per 100 cubic centimeters of solution.

The practice of the invention is illustrated by the following examples:

Example 1

Fifty four pounds of dimethyl isophthalate, 81 pounds of dimethyl terephthalate, and 134 pounds of ethylene glycol were mixed with 0.051 pound of a zinc acetate-manganous acetate-ethylene glycol titanate catalyst and heated at 140° to 230° C. at atmospheric pressure. The catalyst contained 80 parts by weight of zinc acetate, 13 parts by weight of manganous acetate and 7 parts by weight of polymeric ethylene glycol titanate containing 25.45% of titanium, which is more fully described in copending application Serial No. 596,419, filed July 9, 1956, now U.S. Patent No. 3,047,515. The methyl alcohol liberated was distilled off. The bis glycol esters formed were then mixed with a silica-ethylene glycol slurry comprising 3.71 pounds of a porous silica powder having an average particle diameter of 7 microns and a bulk density of 9.9 pounds per cubic foot suspended in 12 pounds of ethylene glycol (2.75% silica based on the weight of the dimethyl phthalate esters used). The temperature of the bis glycol esters-silica mixture was maintained at 230° C. while the pressure was reduced to 5 to 50 millimeters of mercury pressure where excess glycol and over 95% of the glycol from the condensation polymerization reaction was distilled out. The bis glycol esters or low molecular weight polymers thereof were then polymerized to high molecular weight polymers by heating at 270° C. to 275° C. at 0.5 to 1 millimeter mercury pressure. The polyester formed had an intrinsic viscosity of 0.671. It was cooled, ground to pass a ⅜″ screen and dried. The granular polymer was then melted and extruded through a circular die to form a film having a gauge of 300 mils and a gloss of 41 as determined on the Gardner Gloss Meter. The intrinsic viscosity of the extruded film was 0.600. The drop in intrinsic viscosity on extrusion into film was thus found to be 0.071 or 10.6%.

A sample of the dry polymer made in the above process was tested for thermal stability by heating it for 1 hour at 280° C. in a slow stream of nitrogen (1 to 5 bubbles of nitrogen gas per minute over the surface of the polymer melt). The initial melt viscosity of the original polymer was 2,038 poises at 280° C. The melt viscosity of the polymer after heating for 1 hour at 280° C. was 407 poises.

*Example 2*

Fifty four pounds of dimethyl isophthalate, 81 pounds of dimethyl terephthalate, and 0.051 pound of zinc acetate-manganous acetate-ethylene glycol titanate catalyst as used in Example 1 were heated at 140° to 200° C. at atmospheric pressure. The methyl alcohol liberated was removed. Then 3.38 pounds of a porous silica powder having an average particle diameter of 11 microns and a bulk density of 16 pounds per cubic foot (2.5% of silica based on the dimethyl phthalate esters used) were added and the mixture was heated to 230° C. and maintained at 230° C. while the pressure was reduced to 50 millimeters of mercury pressure. Glycol was distilled out. The bis glycol esters or low molecular weight polymers thereof were then polymerized to a high molecular weight superpolyester by heating at 270° to 275° C. at 0.5 to 1 millimeter of mercury pressure. The polyester polymer formed was cooled, ground and dried. The polymer had an intrinsic viscosity of 0.670. Film was made from this polymer by extrusion as in Example 1. The film had an intrinsic viscosity of 0.621. It had a gloss rating of 39 as determined on the Gardner Gloss Meter. The intrinsic viscosity drop on extrusion was 0.049 or 7.3%.

*Example 3*

Fifty four pounds of dimethyl isophthalate, 81 pounds of dimethyl terephthalate, 134 pounds of ethylene glycol, and 11 pounds of 2,2 - bis[(4 - (beta hydroxyethoxy) phenyl]propane (5 mole percent based on moles of dimethyl esters) were mixed with 0.051 pound of of zinc acetate-manganous actate-ethylene glycol titanate catalyst as used in Example 1 and heated at 140° to 230° C. at atmospheric pressure. The methyl alcohol liberated was distilled off. The bis glycol esters formed were then mixed with a silica-ethylene glycol slurry comprising 3.71 pounds of the porous silica powder used in Example 5 in 12 pounds of ethylene glycol (2.75% silica based on the weight of the dimethyl phthalate esters used). The bis glycol esters-silica mixture was manitained at 230° C. while the pressure was reduced to 50 millimeters of mercury pressure and the ethylene glycol liberated was removed. The bis glycol esters or low molecular weight polymers thereof were polymerized to a high molecular weight superpolyester by heating at 270–275° C. at 0.5 to 1 millimeter of mercury pressure. The polyester formed was cooled, ground, and dried. The intrinsic viscosity of the polymer was 0.668. It was extruded into film as in Example 1. The film made from this polymer had a gloss rating of 48 as measured on the Gardner Gloss Meter and an intrinsic viscosity of 0.577. The drop in intrinsic viscosity on extrusion into film was 0.091 or 13.6%. The high percent drop is intrinsic viscosity on extrusion showed this polymer to have poor thermal stability.

*Example 4*

Fifty four pounds of dimethyl isophthalate, 81 pounds of dimethyl terephthalate, 91.5 pounds of ethylene glycol, and 0.051 pound of zinc acetate-manganous acetate-ethylene glycol titanate catalyst as used in Example 1 were mixed together and heated at from 140° to 230° C. at atmospheric pressure. Methyl alcohol liberated was removed. The mixture was then maintained at 230° C. while the pressure in the reaction vessel was gradually reduced to about 6 millimeters of mercury pressure at which point in the condensation polymerization reaction at least 97% of the total removable glycol had been distilled off. (The total removable glycol is the amount of glycol in excess of the stoichiometric amount required to react with the dimethyl phthalate esters to form the bis glycol esters plus the amount theoretically removable in the condensation polymerization reaction.) Three and thirty eight hundredths pounds of the porous silica used in Example 2 (2.5% based on the dimethyl esters used) were added. The polymerization reaction was continued at a temperature of 270° to 275° C. at 0.5 to 1 millimeter of mercury pressure to give the high melt viscosity superpolyester. The polyester formed was cooled, ground, and dried. The polyester had an intrinsic viscosity of 0.652. It was extruded into film as in Example 1. The resulting film had a gloss of 41 as measured on the Gardner Gloss Meter. The intrinsic viscosity after extrusion into film was 0.636. The drop in intrinsic viscosity on extrusion was 0.016 or 2.4%. The polymer prepared in this example was tested for thermal stability according to the method of Example 1. The initial melt viscosity of the original polymer at 280° C. was 2677 poises. After one hour of heating at 280° C. the melt viscosity was 1923 poises.

*Example 5*

Fifty four pounds of dimethyl isophthalate, 81 pounds of dimethyl terephthalate, and 134 pounds of ethylene glycol were mixed with 0.051 pound of a zinc acetate-manganous acetate-ethylene glycol titanate catalyst as used in Example 1 and heated at 140° to 230° C. at atmosphereic pressure. The methyl alcohol liberated was distilled off. The bis glycol esters formed were then maintained at 230° C. while the pressure in the reaction vessel was gradually reduced to 2 mm. of mercury pressure at which point in the condensation polymerization reaction at least 98% of the total removable glycol had been distilled off. Then a slurry of 3.71 pounds (2.75% silica based on the weight of the dimethyl phthalate esters used) of a porous silica powder having an average particle diameter of 7 microns and a bulk density of 9.9 pounds per cubic foot in 11.8 pounds of tetralin was added. The low molecular weight polymer was then polymerized to a high molecular weight polymer by heating at 270° to 275° C. at 0.5 to 1.0 millimeter of mercury pressure. The polymer formed was cooled, ground and dried. The polyester had an intrinsic viscosity of 0.686. It was extruded into film as in Example 1. The resulting film had a gloss of 34 as measured on the Gardner Gloss Meter. The intrinsic viscosity of the film was 0.670. The drop in intrinsic viscosity on extrusion into film was 0.016 or 2.3%. The low percent drop in intrinsic viscosity on extrusion into film shows this polymer to have good thermal stability.

*Example 6*

Fifty four pounds of dimethyl isophthalate, 81 pounds of dimethyl terephthalate, and 100 pounds of ethylene glycol were mixed with 0.051 pound of zinc acetate-manganous acetate-ethylene glycol titanate catalyst as used in Example 1 and heated at 140° C. to 230° C. at atmospheric pressure. The methyl alcohol liberated was distilled off. The bis glycol esters were then maintained at 230° C. while the pressure in the reaction vessel was gradually reduced to 30 mm. of mercury pressure at which point in the condensation polymerization reaction at least 95% of the total removable glycol had been distilled off. Then 4.05 pounds (3.0% based on the dimethyl esters used) of a refined grade of ground sand (98% under 10 microns particle size) having a bulk density of 165 pounds per cubic foot were added. The polymerization reaction was continued at a temperature of 270° to 275° C. at 0.5 to 1 millimeter of mercury pressure. The polyester formed was cooled, ground, and dried. The intrinsic viscosity of the polymer was 0.677. The film had a gloss of 87 as measured on the Gardner Gloss Meter. The intrinsic viscosity after extrusion into film was 0.657. The drop in intrinsic viscosity on extrusion into film was 0.020 or 3.0%. This example shows that, while ground sand does not give the flatting effect, addition in accordance with the method of the present invention does give a stable polymer.

Examples 1, 2 and 3 show that when the silica is added as a powder or as a glycol slurry early in the process where an appreciable quantity of glycol is present or can be liberated during the polymerization reaction the resulting polymer is thermally unstable. Stable polyester compositions are obtained when the silica is added to the polyester-forming reactants after the excess glycol has been removed and the condensation reaction has proceeded to a point where at least 75 percent of the glycol eliminated in the condensation polymerization reaction has been removed, but it is preferred to add the silica powder later in the process when the glycol in excess of the stoichiometric amount required to react with the dimethyl phthalate esters to form the bis glycol phthalate esters has been removed and the condensation reaction has proceeded to a point where at least 94 percent and preferably at least 97 percent of the glycol eliminated in the condensation reaction has been removed. In order to obtain good physical properties in the films, the condensation polymerization reaction should be continued until the polyester formed has an intrinsic viscosity of at least 0.5. Generally the condensation reaction is continued until the polyester has an intrinsic viscosity of at least 0.58. The silica can be added as a dry powder or as a slurry in an inert liquid.

The silica used for flatting the polyesters of this invention is a porous, sponge-like material having a particle size range of from 1 to 20 microns average diameter and bulk density of 4.0 to about 18 pounds per cubic foot. The material has the general chemical formula $SiO_2$ but is quite different in physical properties from silica such as ground sand which is a solid, dense substance having a bulk density of about 160 pounds per cubic foot. Ground sand does not give any appreciable flattening effect to the polyesters of this invention.

The silica used in this invention can be prepared by the following general procedure:

A refined quality sand having very low iron content and containing about 99% $SiO_2$ is fused with alkali to form sodium silicate. The sodium silicate is hydrolyzed by an acid such as sulfuric acid, to silica gel. The gel is dehydrated by drying in a kiln and is then ground to a fine particle size in the range of from 1 to 20 microns average diameter. The ground material is then further dehydrated by heating at 525° to 650° C. for about twelve hours, or at higher temperatures (650° C. to 750° C.) for short contact times (one-half hour to one and one-half hours). The diatomacious silicas and silica aerogels may also be used in accordance with the method of the present invention.

The flattening efficiency of the silica used in this invention increases with an increase in particle size. Thus, 2.5% of silica by weight, based on the weight of dimethyl esters used, having an average particle size of 11 microns gives the same flattening effect as measured by the Gardner Gloss Meter that is given by 2.75% of silica having a particle diameter of 6 to 7 microns and the same flatting efficiency as 3% of silica having a mean particle diameter of 4 microns. The silica pigments usable in this invention have an average particle diameter of from 1 micron to 20 microns. The preferred average particle size is from 7 to 15 microns. The amount of silica used will vary depending on the flatting effect desired. The range used can be from 0.25 to 10.0% or more by weight based on the weight of the dimethyl esters used. From 0.25 to 5.0% will usually be enough and generally from 0.5 to 3% is sufficient.

The silica used should be substantially dry, that is, contain 2% or less of removable water when heated at 550° C. for 2½ hours. It has been found that the presence of water slows the polymerization reaction so the moisture content of the silica is desirably below 1% and generally below 0.25%. It is preferred that the moisture content be less than 0.1% so that the reaction times will not be affected.

The effect of moisture content of silica on reaction time has been found to be as follows: Silica having a moisture content of from 1 to 3% will give polymerization reaction times of from 3 to 4 hours when the silica powder is added at a point where at least 97% of the total removable glycol has been removed. Silica containing less than 0.2% moisture gives reaction times in the range of 2¼ hours to 2½ hours when the silica powder is added at a point where 97% of the total removable glycol has been removed. The silica powders are very hygroscopic but the moisture content can readily be reduced to below 0.2% by heating at a temperature above 525° C. The silica powder should not be heated at a temperature which will discolor it or cause sintering of the particles because this will reduce bulk density, change the character of the particles, and cause the silica to lose some of its flatting efficiency.

The films of this invention have improved stability and resistance to ultra violet light degradation. This is illustrated in the following table wherein film containing 2.5% silica and clear film containing no silica or other material were exposed to ultra violet light in the Fadeometer machine and the intrinsic viscosity of the polymer in the film was determined after 500 hours of exposure and compared with the intrinsic viscosity of the polymer in the film before exposure.

SILICA PIGMENTED FILM

| Sample No. | Original Intrinsic Viscosity | After 500 Hours Fadeometer Aging |
|---|---|---|
| 1* | 0.646 | 0.643 |
| 2* | 0.641 | 0.637 |

| CLEAR FILM | | |
|---|---|---|
| 3 | 0.649 | 0.602 |
| 4 | 0.639 | 0.609 |

*Samples No. 1 and 2 contained 2.5% silica.

The examples have shown the preparation of silica pigmented superpolyesters by the addition of silica as a dry powder. While it is preferred to add the silica as a dry powder, it can also be added as a slurry in an inert, non-reactive liquid such as tetralin (tetrahydronaphthalene). Representative examples of other non-reactive liquids that can be used are durene and triethyl benzene. When the silica is added as a slurry in an inert liquid, it is obvious that the liquid should have a boiling point low enough that it will be removed from the system during the polymerization reaction and high enough that it will not immediately distill out of the reactor and cause foaming and frothing of the polyester forming materials. The amount of the inert, non-reactive liquid used is not critical, but enough should be used to make a thin, free-flowing slurry without introducing an excessively large amount that will have to be removed from the polyester forming reactants. The ratio of about 4 pounds of the inert liquid to 3.5 pounds of the silica powder is generally satisfactory, but higher or lower ratios of inert liquid to silica can be used, if desired. The examples have also shown the addition of the silica at a point where about 97% of the glycol has been removed to produce a superpolyester having good thermal stability. The silica can be added at any point after at least 75 percent of the glycol eliminated in the condensation reaction has been removed but before the polymerization reaction is completed. The final polymer is very viscous, and as indicated above, it is extremely difficult to obtain uniform dispersion in such a viscous material if the silica is added at the end of the polymerization reaction. In general, an appreciable drop in intrinsic viscosity of the polymer results when an attempt is made to uniformly disperse the silica pigment at the end of the polymerization reaction.

The polyesters with which this invention is concerned are the ethylene terephthalate-ethylene isophthalate copolyesters in which the ethylene trephthalate units comprise from 90 to 15 percent of the sum of the ethylene terephthalate and ethylene isophthalate units in the copolyester and the ethylene isophthalate units correspondingly comprise from 10 to 85 percent of said sum, and the ethylene terephthalate–2,2-bis[4-(beta hydroxyethoxy)phenyl]propane terephthalate copolyesters in which the ethylene terephthalate units comprise from 90 to 30 percent of the sum of the ethylene terephthalate and 2,2-bis[4-(beta hydroxyethoxy)phenyl]propane terephthalate units and the 2,2-bis[4-(beta hydroxyethoxy)-phenyl]propane terephthalate units comprise from 10 to 70 percent of said sum. The preferred copolyesters for use in this invention are the ethylene terephthalate-ethylene isophthalate copolyesters containing from 65 to 50 percent of ethylene terephthalate units and from 35 to 50 percent of ethylene isophthalate units. The 60/40 ethylene terephthalate-ethylene isophthalate copolyester is the most preferred copolyester. The ethylene terephthalate-ethylene isophthalate copolyesters are readily prepared according to the method of copending application Serial No. 413,722, now U.S. Patent No. 2,965,613. The 2,2-bis[4-(beta hydroxyethoxy)phenyl]propane terephthalate copolyesters are prepared according to the method of copending application Serial No. 667,269.

Other copolyesters can also be used. Representative examples of such copolyesters are 2,2-bis[4-(beta hydroxyethoxy)phenyl]propane isophthalate-ethylene isophthalate copolyesters in which the 2,2-bis[4-(beta-hydroxyethoxy)phenyl]propane isophthalate units comprise from 10 to 85 percent of the sum of the 2,2-bis[4-(beta hydroxyethoxy)phenyl]propane isophthalate and ethylene isophthalate units in the copolyesters and the ethylene isophthalate units comprise from 90 to 15 percent of said sum and copolyesters, such as ethylene terephthalate-ethylene hexahydroterephthalate, ethylene terephthalate-hexahydroisophthalate, ethylene terephthalate-tertiary butyl isophthalate, tetramethylene terephthalate-tetramethylene isophthalate, ethylene terephthalate-propylene terephthalate, and tetramethylene terephthalate-tetramethylene isophthalate.

Homopolyesters such as ethylene terephthalate, ethylene isophthalate, and tetramethylene terephthalate can also be used. Terpolymers such as ethylene terephthalate-ethyleneisophthalate-2,2-bis[4-(beta hydroxyethoxy)phenyl]propane terephthalate copolyesters and ethylene terephthalate-ethylene isophthalate–2,2-bis[4-(beta hydroxyethoxy)phenyl]propane isophthalate copolyesters and copolyesters composed of units of 2 or more acids and 2 or more glycols in which the acids can be aromatic acids such as terephthalic and isophthalic acid or the acids can be mixtures of aromatic and aliphatic acids such as mixtures of terephthalic acid and sebacic acid or terephthalic acid and adipic acid.

The examples have illustrated the preparation of the polyesters using a particular catalyst system for the ester interchange and condensation reactions. Other catalysts can also be used. Representative examples of such catalysts are litharge, zinc acetate, lithium hydride, antimony trioxide, manganous acetate, titanium tetrafluoride. It is obvious that concentration of catalyst, temperature and pressure used can be varied. Thus the initial ester interchange can be carried out over a wide temperature range, 140 to 230° C. being the range most generally used at atmospheric pressure or reduced pressure, if desired. The condensation polymerization reaction can also be carried out over a wide range. Usually temperatures in the range of from 230 to 290° C. at 0.05 to 20 millimeters of mercury pressure is used. The preferred temperature range for the condensation polymerization reaction is 260–275° C. at 0.5 to 1.0 millimeter of mercury pressure.

The examples have also illustrated the preparation of the polyesters using the dimethyl esters and glycol as the reactants. Other esters such as the diethyl, dipropyl, dibutyl and diphenyl esters can also be used and other starting materials, for example, the dibasic acids and glycol, and the dibasic acids and a glycol carbonate. The bis glycol ester can be self-condensed to form the polyester. Other suitable polyester-forming reactants can also be used, if desired.

While certain representative embodiments and details have been shown for the purpose of illustrating the invention, it will be apparent to those skilled in this art that various changes and modifications may be made therein without departing from the spirit or scope of the invention.

We claim:

1. The method of preparing a flatted film of a linear super polyester of an aromatic dibasic acid and a glycol which comprises polymerizing bis glycol esters of said acid by condensation reaction by heating under reduced pressure and removing the glycol formed in the condensation reaction until at least 75% of the glycol eliminated in the condensation reaction has been removed, adding from 0.25 to 10.0% by weight, based on the weight of the esters used, of a porous silicon dioxide powder having an average particle diameter of from 1 micron to 20 microns and a bulk density of from 4 to 18 pounds per cubic foot and continuing the condensation polymerization reaction until the copolyester formed has an intrinsic viscosity of at least 0.5 and extruding the polyester to form a film.

2. The method of preparing a flatted film of a linear super polyester which comprises reacting the condensation polymer reactants until at least 94 percent of the glycol removable in the condensation polymerization reaction has been removed and then adding from 0.25 to 10.0 percent by weight based on the weight of the polyester formed of a porous silicon dioxide powder having an average particle diameter of from 1 micron to 20 microns and a bulk density of from 4 to 18 pounds per cubic foot and continuing the polymerization until a polyester having an intrinsic viscosity of at least 0.5 is formed and extruding the polyester to form a film.

3. The method of preparing a flatted film of a linear super polyester selected from the group consisting of (A) ethylene terephthalate-ethylene isophthalate copolyesters in which the ethylene terephthalate units comprise from 90 to 15 percent of the sum of the ethylene terephthalate and ethylene isophthalate units and the ethylene isophthalate units comprise from 10 to 85 percent of said sum and (B) ethylene terephthalate–2,2-bis[4-(beta hydroxyethoxy)phenyl] propane terephthalate copolyesters in which the ethylene terephthalate units comprise from 90 to 30 percent of the sum of the ethylene terephthalate and 2,2-bis[4-(beta hydroxyethoxy)phenyl]propane terephthalate units and the 2,2-bis[4-beta hydroxyethoxy)phenyl] propane terephthalate units comprise from 10 to 70 percent of said sum which comprises reacting the polyester forming reactants until at least 75 percent of the glycol eliminated in the condensation polymerization reaction has been removed, adding to the reactants from 0.25 to 10.0 percent by weight based on the weight of the phthalic esters used of a porous silicon dioxide powder having an average particle diameter of from 1 mircon to 20 microns and a bulk density of from 4 to 18 pounds per cubic foot, and then continuing the condensation polymerization reaction until the copolyester formed has an intrinsic viscosity of at least 0.5 and extruding the polyester to form a film.

4. The method of claim 3 in which the finely divided porous silicon dioxide powder is added at a point in the condensation reaction where from 94 to 97 percent of the glycol eliminated in the condensation polymerization reaction has been removed.

5. The method of preparing a flatted film of a linear ethylene terephthalate-ethylene isophthalate copolyester in which the ethylene terephthalate units comprise from 90 to 15 percent of the sum of the ethylene terephthalate and ethylene isophthalate units in the copolyester and the ethylene isophthalate units comprise from 10 to 85 percent of said sum which comprises (A) reacting dimethyl terephthalate-dimethyl isophthalate mixture with glycol, (B) distilling off the methanol formed and then distilling off the unreacted glycol, (C) polymerizing the bis glycol esters formed by condensation reaction by heating under reduced pressure and removing the glycol formed in the condensation reaction until at least 94% of the glycol eliminated in the condensation reaction has been removed, (D) adding from 0.25 to 10.0% by weight based on the weight of the dimethyl esters used of a substantially dry porous silicon dioxide powder having an average particle diameter of from 1 micron to 20 microns, (E) continuing the polymerization until a polyester having an intrinsic viscosity of at least 0.5 is formed and extruding the polyester to form a film.

6. The method of preparing a flatted film of an amorphous ethylene terephthalate-ethylene isophthalate copolyester in which the ethylene terephthalate units comprise from 65 to 30 percent of the sum of the ethylene terephthalate and ethylene isophthalate units in the copolyester and the ethylene isophthalate units correspondingly comprise from 35 to 70 percent of said sum which comprises (A) reacting dimethyl terephthalate-dimethyl isophthalate mixture with glycol, (B) distilling off the methanol formed and then distilling off the unreacted glycol, (C) polymerizing the bis glycol esters formed by condensation reaction by heating under reduced pressure and removing the glycol formed in the condensation until at least 94% of the glycol eliminated in the condensation reaction has been removed, (D) adding from 0.25 to 10.0 percent by weight based on the weight of the dimethyl esters used of a substantially dry porous silicon dioxide powder having an average particle diameter of from 1 micron to 20 microns and a bulk density of from 4.0 to 18.0 pounds per cubic foot, (E) continuing the polymerization until a copolyester having an intrinsic viscosity of at least 0.5 is formed and extruding the copolyester to form film.

7. The method of preparing a flatted film of a 60/40 ethylene terephthalate-ethylene isophthalate copolyester which comprises reacting a 60/40 mixture of dimethyl terephthalate and dimethyl isophthalate with ethylene glycol, distilling off the methanol formed and then distilling off unreacted glycol, polymerizing the bis glycol esters formed by condensation reaction by heating under reduced pressure and removing the glycol eliminated in the condensation reaction until at least 94% of the glycol eliminated in the condensation reaction has been removed, adding from 0.25 to 5.0% by weight based on the weight of the dimethyl esters used of a substantially dry porous silicon dioxide powder having an average particle diameter of from 7 microns to 15 microns and a bulk density of from 4.0 to 18.0 pounds per cubic foot, continuing the polymerization until a copolyester having an intrinsic viscosity of at least 0.5 is formed and extruding the copolyester to form a film.

8. A process according to claim 3 in which the silica powder contains less than 1% of water.

9. The method of preparing a flatted film of a linear super polyester which comprises reacting the polyester forming reactants until at least 94 percent of the glycol eliminated in the condensation reaction is removed and then adding a slurry containing from 0.25 to 10.0 percent by weight based on the weight of the copolyester formed of a porous silica powder in an inert liquid, said silica powder having an average particle diameter of from 1 micron to 20 microns and a bulk density of from 4 to 18 pounds per cubic foot and continuing the polymerization until a copolyester having an intrinsic viscosity of at least 0.5 is formed and extruding the polyester to form a film.

10. The method of stabilizing a copolyester selected from the group consisting of (A) ethylene therephthalate-ethylene isophthalate copolyesters in which the ethylene terephthalate units comprise from 90 to 15 percent of the sum of the ethylene terephthalate and ethylene isophthalate units and the ethylene isophthalate units comprise from 10 to 85 percent of said sum and (B) ethylene terephthalate-2,2-bis[4-beta hydroxyethoxy)phenyl]propane terephthalate copolyesters in which the ethylene terephthalate units comprise from 90 to 30 percent of the sum of the ethylene terephthalate and 2,2-bis[4-(beta hydroxyethoxy)phenyl]propane terephthalate units and the 2,2-bis[4-(beta hydroxyethoxy)phenyl]propane terephthalate units comprise from 10 to 70 percent of said sum which comprises reacting the copolyester forming reactants by ester interchange reaction to form the bis glycol esters and polymerizing the bis glycol esters by condensation reaction until at least 94% of the glycol eliminated in the condensation reaction has been removed, adding from 0.25 to 10% by weight based on the copolyester of a porous silica powder having an average particle diameter of from 1 micron to 20 microns and a bulk density of from 4 to 18 pounds per cubic foot, and then continuing the polymerization until a copolyester having an intrinsic viscosity of at least 0.5 is formed.

11. The method of claim 10 in which the copolyester is extruded by melt extrusion process to form a film.

References Cited in the file of this patent

UNITED STATES PATENTS

| | | |
|---|---|---|
| 2,278,878 | Hoff | Apr. 7, 1942 |
| 2,689,839 | Heckert | Sept. 21, 1954 |
| 2,717,214 | Marotta et al. | Sept. 6, 1955 |
| 2,729,619 | Sullivan | Jan. 3, 1956 |
| 2,729,620 | Sullivan | Jan. 3, 1956 |
| 2,784,456 | Grabenstein | Mar. 12, 1957 |
| 2,819,173 | Dithmar | Jan. 7, 1958 |
| 2,941,970 | Craig | June 21, 1960 |
| 2,965,613 | Milone et al. | Dec. 30, 1960 |